United States Patent

Sarada et al.

[11] Patent Number: 5,091,006
[45] Date of Patent: Feb. 25, 1992

[54] SOLUTION FLUORESCENT INKS

[75] Inventors: Thyagaraj Sarada, Norwalk, Conn.; Norman C. Hochwalt, West Carrollton, Ohio

[73] Assignee: Pitney Bowes Inc., Stamford, Conn.

[21] Appl. No.: 547,717

[22] Filed: Jul. 3, 1990

Related U.S. Application Data

[63] Continuation-in-part of Ser. No. 268,130, Nov. 7, 1988.

[51] Int. Cl.$^5$ .................. C09K 11/02; C09D 11/10
[52] U.S. Cl. ................................ 106/22; 252/301.35
[58] Field of Search ................. 106/22; 252/301.35

[56] References Cited

U.S. PATENT DOCUMENTS

| | | | |
|---|---|---|---|
| 4,153,593 | 5/1979 | Zabiak et al. | 106/22 |
| 4,186,020 | 1/1980 | Wachtel | 106/22 |
| 4,328,332 | 5/1982 | Hayes | 528/296 |
| 4,620,197 | 10/1986 | Miyamoto | 106/22 |
| 4,732,613 | 3/1988 | Shioya et al. | 106/22 |
| 4,735,657 | 4/1988 | Baxter et al. | 106/22 |
| 4,767,459 | 8/1988 | Greenwood et al. | 106/22 |

FOREIGN PATENT DOCUMENTS 62-30169  2/1987  Japan ..................... 106/22

*Primary Examiner*—Paul Lieberman
*Assistant Examiner*—Mary DiNunzio
*Attorney, Agent, or Firm*—Peter Vrahotes; Melvin J. Scolnick; David E. Pitchenik

[57] ABSTRACT

A homogeneous fluorescent ink has been conceived that has particular use in devices such as inking components of postage meters. The inks are in the form of solutions, and contain a soluble fluorescent toner that is dissolved within a polar organic solvent. Additives can be used to modify the properties of the ink.

6 Claims, No Drawings

SOLUTION FLUORESCENT INKS

BACKGROUND OF THE INVENTION

There are certain situations in which a fluorescent ink is used for detection purposes. Such fluorescent inks will have one color, such as black or red, when viewed in ambient light, but upon being exposed to ultraviolet light will display another color such as green or yellow. Examples in which such inks can be used are in the machine processing of various types of information on tickets, tags, labels, postage indicia or imprints, and the like. In the case of postage indicia, facer canceller tables and metered mail handling equipment are fitted with luminescent ink detecting devices that expose the postage indicia to an ultraviolet light during the automatic processing of mail to expose the indicia to an ultraviolet light during the automatic processing of mail to assure the indicia is genuine and postage has been paid. If the specified luminescent signal is not viewed during exposure, the postal clerk is required to hand cancel the postage indicia if it proves genuine.

Fluorescent inks that have been used in postage meters to print postage indicia in the past have worked well, but they have certain shortcomings. The compositions of these fluorescent inks has been in the form of a dispersion. Postage meter inks have been made by dispersing a fluorescent pigment (toner) into an oily liquid. Other pigments have been added to provide color shifts. These inks, however, do not meet all the contemporary requirements.

In fact, dispersion inks have drawbacks due to the nature of the ink itself. As a dispersion, great care must be taken during formulation to provide a uniform ink. The particle size distribution of the toner pigments must be controlled as well as any added coloring pigments. As the experienced formulator will attest, matching these pigment particle sizes to prevent settling and reduce the tendency to aggregate, agglomerate, and settle is quite difficult. For practical purposes, one must require some agitation prior to use. Thus, a dispersion ink must rely on an operator to "Shake Well Before Use" in order to provide a consistently acceptable quality of print. This aggregation and agglomeration also requires the use of large pore foams for ink delivery. As in any process which transfers ink, a smooth layer of ink is required for a consistently uniform print with few voids and intensity variations throughout the inked regions. This is accomplished by the use of a smooth, tight pore inking surface with average pore dimensions usually on the order of 5 to 15 micrometers. At this level, agglomerated pigments tend to plug these openings causing reduced quality of print.

Another problem which may be attributed to the nature of a pigmented postage meter ink is print to print color variation. When multiple pigments are used, the particle size distribution and specific gravity of the pigments do not settle in a uniform manner. Thus, the portion of ink near the surface may be a significantly different color than the ink near the bottom. This difference is observed as inconsistent colors from print to print.

It has long been recognized that a fluorescent ink in solution form would be more desirable because of its advantageous properties of Newtonian viscosities that are not dependent on shear rates under normal conditions. Thus, the flow properties of solutions can be controlled more easily than dispersions. To date, no adequate solution fluorescent ink has been found because certain properties are required that could not be achieved in the past. A boiling point of over 250° C. along with a very low vapor pressure, such as less than 0.05 mm Hg (at 25° C.), are criteria that provide solvents which do not dry on critical machine components and have a reduced hazard from fire or explosion. This safety aspect of the solvents is a critical criteria. To ensure safety to the machine user, the solvents should have been tested and ruled acceptable.

SUMMARY OF THE INVENTION

A homogeneous fluorescent ink has been discovered which relies on solubilizing and dissolving the fluorescent toner in a matrix of polar organic solvents. The solvent normally makes up 50 to 90% of the solution and the soluble fluorescent resin accounts for 10–50% of the ink. Preferably, not more than 5% of toning dye is added to the solution. Viscosity modifiers and luminescence enhancers can be added as needed. It has been found preferable to have a combination of fluorescent resins and polar organic solvents such as triethylene glycol, glycerine and glycol ethers, for example.

DETAILED DESCRIPTION OF THE PREFERRED EMBODIMENT

Fluorescent inks of the solution type have been formulated by using polar organic solvents to which fluorescent toners are added. The polar organic solvents should have a matching polarity to the fluorescent resins with which it is used, have a boiling point of greater than a 250° C., low vapor pressure at ambient, i.e. less than 0.05 mm of mercury, and should be water tolerant but not absorb excess water.

For purposes of this invention, polar organic solvents are defined as those solvents that have a total solubility parameter, $\delta$, of approximately 18 to 32. Reference can be had to page 156 of the CRC Handbook of Solubility Parameters and Other Cohesion Parameters (1983) published by CRC Press, Inc., Boca Raton, Fla. Solvents which have been found suitable are triethylene gloycol, glycerine, ethylene glycol phenyl-ether, tripropylene glycol methyl-ether and tripropylene glycol. The solvents will constitute 50 to 90% by weight of the solution. The fluorescent toners will constitute 10 to 50% by weight of the solution and should be polar resins such as amino-aldehyde plastics or polyesters. All component percentages in this specification, including the claims, are weight percent. Fluorescent toners are commercially available products comprised of a fluorescening dye and fluorescence enhancers dispersed within a friable polymeric matrix. Such fluorescent toners are available commercially from Day Glo Color Corp. Cleveland Ohio and identified as the HMS series of toners. The materials are typically similar to those disclosed in U.S. Pat. No. 3,518,205. Basically, these toners are dyed melamine copolymer resins such as a mixture of fluorescent dyes in a polymer of benzenesulfonamide, ar-methyl-formaldehyde and tetrahydoimidazo [4,5-d] imidazole-2,5 (1H, 3H)-dione with a molecular weight average of 1000 to 15,000. While the chemical structure of the resin used to create the polymeric matrix may vary from polyamides to polyesters, the formulations of the instant fluorescent inks are concerned with those resins that can be made soluble.

The toning, or coloring, dyes should constitute less then 5% of the solution, preferably less than 3%. These are used to affect the hue of the final ink. Other additives such as viscosity modifiers, print quality enhances and fluorescence enhancers can be used, up to 5% each as needed. The solvents must be polar and aggressive enough to dissolve the toners yet not overly aggressive. Material compatibility must be a criteria of formulation. Postage meters utilize a wide range of plastic, rubber, and metal parts. Ideally, the solvents will not cause detrimental effects to the mechanical properties of the materials in use. Of particular interest is the rubber. Many postage meters use soft dies for enhanced printing. Many of these are acrylonitrile rubbers with low cross link densities. It is imperative that the selected solvents not attack or adversely effect the printing die, since these are printing dies monitored by postal agencies and each die has a unique serial number. Consequently, care should be taken in the selection of the fluorescent ink components to assure there is no adverse affect on rubber components if the inking system contains the same.

Organic solvents which have been found suitable include triethylene glycol, tripropylene glycol, glycerol, propylene carbonate, gamma-butyrolactone and, longer chain glycols such as hexylene glycol.

The viscosity of the homogeneous postage meter ink is critical for acceptable performance. The print quality of the printed image is critically affected by the volume of ink transferred to the paper. The viscosity of the ink acts as a control mechanism for flow through a porous foam and also for the spread and penetration into the paper. It has been demonstrated that viscosities in the range of 300-3000 cP are most useful for postage meter printing using porous foam. Inks with viscosities below this range, such as the low viscosity 10 cP inks used in ink jet printing, flow quite readily through the porous foams and deliver excess ink to the meter die. This results in an excess of ink placed on the paper. The print quality is severely affected as the ink spreads rapidly, resulting in poor edge acuity, broad lines, lack of fine detail, paper dependance, and prints that are unacceptable to the customer and the postal agencies. Ink with too high a viscosity does not flow well through the porous foam resulting in a reduced amount of ink on the meter die. This results in problems such as slow drying of the print, lack of fill of solid areas, broken lines, and light prints. The stated range, and more preferably 600-1600 cP, results in adequate flow through the porous foams while providing acceptable print quality. Examples of solution ink formulations are as follows:

| Example 1 | |
|---|---|
| Ingredient | Amount % |
| Triethylene glycol (TEG) | 20 |
| Glycerine | 20 |
| Ethylene glycol phenyl-ether (EPH) | 10 |
| Tripropylene glycol methyl-ether (TPM) | 20 |
| Fluorescent resin such as HMS 30 | 25 |
| p - Toluene Sulfonamide | 5 |
| | 100% |

HMS 30 is a dyed melamine copolymer resin available from Day Glow Color Corporation.

| Example 2 | |
|---|---|
| Ingredient | Amount (%) |
| Klucel | 3 |
| HMS 30 | 10 |
| Tripropylene glycol methyl-ether (TPM) | 85 |
| Tributyl phosphate | 2 |
| | 100% |

Klucel is a viscosity modifier available from Hercules Corp., Wilmington, Del.

| Example 3 | |
|---|---|
| Ingredient | Amount (%) |
| HMS 30 | 16 |
| HMS 34 | 4 |
| Oleic Acid | 10 |
| Neptun Yellow 076 Dye | 0.93 |
| Neptun Red 543 Dye | 0.562 |
| Tripropylene Glycol | 45.5 |
| Triethylene Glycol | 23 |
| | 100% |

HMS 34 is a dyed melamine copolymer resin availabe from Day Glo Color Corporation.

Neptun Yellow 076 dye and Neptun Red 543 dye are available from BASF.

| Example 4 | |
|---|---|
| Ingredient | Amount (%) |
| HMS 30 | 20 |
| HMS 34 | 5 |
| Tripropylene Glycol | 25 |
| Green Dye | 5 |
| Ameroxol - Amerchol Corp. (oleyl alcohol ethyo lates) | 5 |
| G-2109, (polyoxyethylene C12 fatty later available from ICI Americas) | 40 |
| | 100% |

The above inks were tested in conditions that simulated the conditions of printing with a postage meter and were found to be satisfactory in terms of printing postage indicia, shelf life, and resistance to temperature extremes. Most importantly, the components of the ink did not settle when the inks were not in use.

What is claimed is:

1. A homogeneous fluorescent ink for use with porous foam applicators, comprising: 10 to 50% soluble fluorescent resin toner, 50 to 85% polar organic solvent, not more than 5% dye, wherein said polar organic solvent has a boiling point greater than 250° C. and a vapor pressure less than 0.05 mm Hg at 25° C.

2. The fluorescent ink of claim 1 wherein said solvent is selected from the group consisting of triethylene glycol, glycerine, tripropylene glycol methyl-ether, tripropylene glycol and ethylene glycol phenyl-ether.

3. The fluorescent ink of claim 1 wherein said ink has a viscosity of 300-3000 cP.

4. A fluorescent ink comprising: 20% triethylene glycol, 20% glycerine, 10% ethylene glycol phenyl-ether, 20% tripropylene glycol methyl-ether, 25% fluorescent resin and 5% p-toluene sulfonamide.

5. A fluorescent ink comprising: 20% triethylene glycol, 20% glycerine, 10% ethylene glycol phenyl-ether, 20% triporpylene glycol methyl-ether, 25% fluorescent resin, and 5% p-toluene sulfonamide.

6. A fluorescent ink, comprising: 3% viscosity modifier, 10% soluble fluorescent resin, 85% tripropylene glycol methyl-ether and 2% tributyl phosphate.

* * * * *